US008733999B2

(12) United States Patent
Rahamim et al.

(10) Patent No.: US 8,733,999 B2
(45) Date of Patent: May 27, 2014

(54) METHOD AND APPARATUS PERTAINING TO DISPLAY BACKLIGHTING

(76) Inventors: Reuven Rahamim, St. Louis Park, MN (US); John Souter, Wayzata, MN (US)

(*) Notice: Subject to any disclaimer, the term of this patent is extended or adjusted under 35 U.S.C. 154(b) by 380 days.

(21) Appl. No.: 13/215,786

(22) Filed: Aug. 23, 2011

(65) Prior Publication Data

US 2013/0050986 A1 Feb. 28, 2013

(51) Int. Cl.
*F21V 7/04* (2006.01)
(52) U.S. Cl.
USPC ........... 362/612; 362/613; 362/617; 362/619; 362/623
(58) Field of Classification Search
USPC ......... 362/600, 606, 607, 612, 613, 615, 617, 362/621, 623, 629, 619
See application file for complete search history.

(56) References Cited

U.S. PATENT DOCUMENTS

| 5,719,649 | A | 2/1998 | Shono |
| 6,164,791 | A | 12/2000 | Gwo-Juh |
| 6,895,705 | B2 | 5/2005 | Hillstrom |
| 6,908,204 | B2 * | 6/2005 | Kraft .............................. 362/628 |
| 7,018,087 | B2 | 3/2006 | Yoo |
| 7,246,933 | B2 * | 7/2007 | Kunimochi ................... 362/620 |
| 7,400,817 | B2 | 7/2008 | Lee |
| 7,524,101 | B2 | 4/2009 | Parker |

OTHER PUBLICATIONS 2 pages of International Search Report for PCT/US2012/051571 which is a counterpart application, dated Nov. 14, 2012.

* cited by examiner

*Primary Examiner* — Thomas Sember
(74) *Attorney, Agent, or Firm* — Sturm & Fix LLP

(57) ABSTRACT

An apparatus comprises a display backlight having a substrate and a plurality of light-receiving channels formed in that substrate. At least some of these channels have a depth that varies as a gradient along a longitudinal axis of the channel that is substantially axially aligned with a light-receiving input for the channel. These channels can be formed substantially parallel to one another. The aforementioned light-receiving inputs can, if desired, be formed at either end of each such channel and can be disposed inwardly of an edge of the substrate. Also if desired, at least some of these channels can be disposed other than at an orthogonal angle with respect to such substrate edges. So configured, light rays that orthogonally enter the light-receiving inputs will have an opportunity to contact the edges of the channels and be reflected outwardly of the channel to provide the desired backlighting effect.

19 Claims, 5 Drawing Sheets

METHOD AND APPARATUS PERTAINING TO DISPLAY BACKLIGHTING

TECHNICAL FIELD

This invention relates generally to signage and more particularly to display backlighting.

BACKGROUND

Signs of various kinds are known in the art. Signs vary in size, shape, and composition but typically serve to present text and/or images that can be viewed by an observer. Signs often serve a promotional purpose, in which case the text/images typically convey information regarding the goods or services of a given brand.

Signs are often illuminated to facilitate viewing. In some cases this comprises applying light to the viewed side of the sign. In other cases this comprises applying light from behind and through the sign. The latter approach is known as backlighting.

Closely-spaced fluorescent-lighting tubes often serve in these regards. Unfortunately, though effective for at least some application settings, fluorescent tubes typically contain mercury. This mercury, in turn, complicates disposing of or recycling fluorescent tubes. Fluorescent tubes are also relatively large and come in only a few form factors and sizes. These size restrictions, in turn, can limit design freedom for the sign designer.

BRIEF DESCRIPTION OF THE DRAWINGS

The above needs are at least partially met through provision of the method and apparatus pertaining to display backlighting described in the following detailed description, particularly when studied in conjunction with the drawings, wherein.

Figure 1:
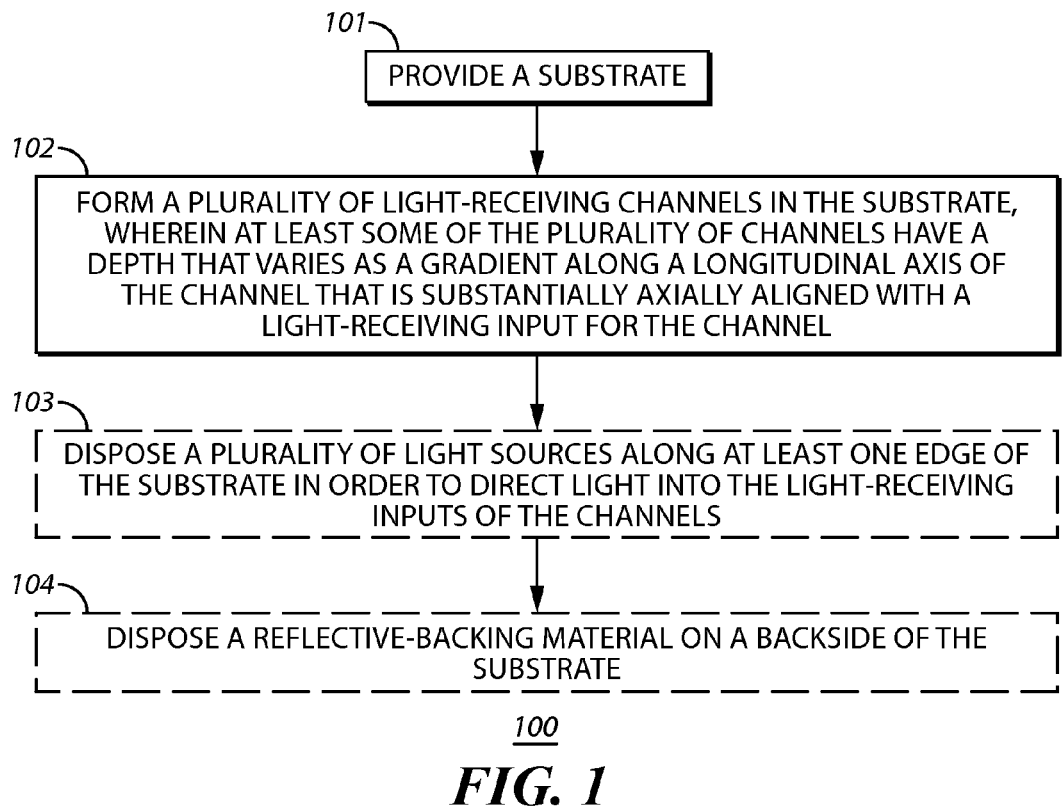
FIG. 1 comprises a flow diagram as configured in accordance with various embodiments of the invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, an apparatus can comprise a display backlight having a substrate and a plurality of light-receiving channels formed in that substrate. At least some of these channels have a depth that varies as a gradient along a longitudinal axis of the channel that is substantially axially aligned with a light-receiving input for the channel.

By one approach these channels can be formed substantially parallel to one another. The aforementioned light-receiving inputs can, if desired, be formed at either end of each such channel and can be disposed inwardly of an edge of the substrate. Also if desired, at least some of these channels can be disposed other than at an orthogonal angle with respect to such substrate edges. So configured, light rays that orthogonally enter the light-receiving inputs will have an opportunity to contact the edges of the channels and be reflected outwardly of the channel to provide the desired backlighting effect.

By one approach these channels can be substantially equally spaced from one another. A plurality of light-emitting diodes can be disposed along opposing edges of the substrate to provide sources of light rays to enter the aforementioned light-receiving inputs. By one approach a single such light-emitting diode can provide light for a plurality of such channels.

So configured, the aforementioned gradient and non-orthogonal orientation of the channels both serve to provide a relatively evenly-distributed output of reflected light from the surface of the substrate. This, in turn, permits a given sign to be evenly backlight without undue hot spots or dark spots.

Such an apparatus can be considerably thinner than a corresponding fluorescent-light backlight. Such an apparatus can also be easily custom designed to accommodate a wide variety of differently-sized and differently-shaped signs. Light-emitting diodes also tend to be considerably more energy-efficient than fluorescent lights and also avoid the mercury-based disposal/recycling dilemma posed by fluorescent lighting. These teachings are highly flexible in practice, can be readily scaled to accommodate a wide variety of application settings, and are economically practiced.

Figure 2:
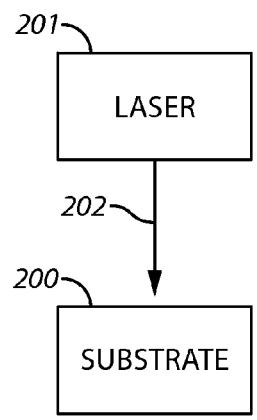
FIG. 2 comprises a block diagram as configured in accordance with various embodiments of the invention.

These and other benefits may become clearer upon making a thorough review and study of the following detailed description. Referring now to the drawings, and in particular to FIGS. 1 and 2, an illustrative process 100 that is compatible with many of these teachings will be presented.

At step 101 this process 100 provides a substrate 200. This substrate 200 can comprise, for example, a substantially planar member. Generally speaking, this substrate 200 will be at least as large as the desired backlighting fixture and sometimes larger. These teachings will also accommodate providing a substrate 200 that is sufficiently large to accommodate fabricating a plurality of backlighting fixtures if desired. For the sake of clarity and simplicity, however, this description will presume the fabrication of only one backlighting fixture from a single substrate.

A variety of materials can serve in these regards. By one approach, suitable for use in numerous application settings, this substrate 200 comprises an acrylic material such as a clear, cell-cast acrylic material having an index of refraction of about 1.49. Desirable materials characteristics for many application settings include having a Rockwell hardness at least equal to M-94 with a modulus of elasticity greater than 400,000 pounds per square inch with light transmission equal to or greater than 92% and haze less than 1%.

Generally speaking, the utilized material is at least substantially transparent though some amount of translucency and/or diffusion may be tolerated or even useful in some application settings. The thickness of the substrate 200 can of course vary with the intended application. For many purposes a thickness range of about 6 millimeters to about 12 millimeters works well.

At step 102 this process 100 then provides for forming a plurality of light-receiving channels in this substrate 200. At least some of these channels (and preferably all of these channels) have a depth that varies as a gradient along a longitudinal axis thereof that is substantially axially aligned with a light-receiving input for each such channel. By one approach (and as illustrated in FIG. 2), this can comprise using one or more lasers 201 to form such channels. In particular, a laser beam 202 as sourced by such a laser 201 can ablate substrate material and thereby form the desired channel. Laser-based ablation comprises a generally well-understood area of endeavor and requires no particular elaboration here. The particular laser employed can of course vary with the needs of a given application setting. Some particularly useful examples of lasers to employ in these regards include, but are certainly not limited to, $CO_2$ lasers having power ranging from about 60 watts to about 200 watts as manufactured by Kern Electronics and Lasers, Inc., MultiCam Inc., and Trotec Laser, Inc.

Industrial lasers are often computer controlled. This control can include not only when the laser is on or off, but also the intensity of the laser beam, the location of the laser beam, an angle of incidence of the laser beam, and possibly other operational parameters as well. These teachings will accommodate programming the control of the utilized laser 201 to produce channels having the aforementioned depth gradient.

As one illustrative example in these regards, and without intending any particular corresponding limitations, the following algorithm can serve to guide the control of such a laser 201:

$$Y=337.47-12.212x+0.48670x^2-1.0124e-2x^3+9.7319e-5x^4-3.5898e-7x^5 R^2=1.000$$

where Y and X represent the Y and X coordinates for the location of the laser beam 201 (note that Y is typically fixed as the laser beam only travels in the X direction), e represents the natural logarithm base, and R2 represents the goodness of fit between the points within the gradation. This algorithm can be normalized as desired over a given length or tonal range and can be customized for any angle, frequency, or line spacing.

This algorithm will create a two-dimensional digital file using gray levels and area/size to modulate the laser beam 202 to etch the substrate 200. This approach employs cubic splines to generate smooth gradations that is substantially void of inflections. More particularly, this algorithm effectively facilitates creation of 1-pixel-tall rectangles and fills those rectangles with a grayscale gradient that begins at approximately 10% black at the beginning and ending of the rectangle and that reaches a maximum of (or about) 100% black at the center of the rectangle. Presuming a given speed or time of exposure, depth is a function of the actual modulated laser power. This actual modulated laser power, in turn, can be a percentage of the actual maximum available laser power. For example, using 60% of maximum laser power will produce a pixel cell depth that is less deep than using, say, 70% of available laser power when modulated at a same speed.

Figure 3:
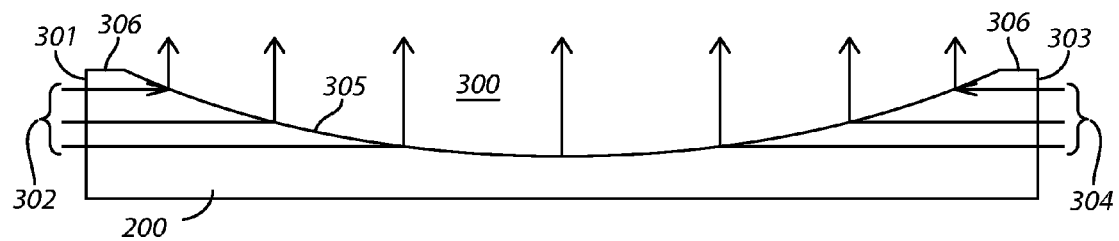
FIG. 3 comprises a side-elevational detail view as configured in accordance with various embodiments of the invention.
Figure 4:
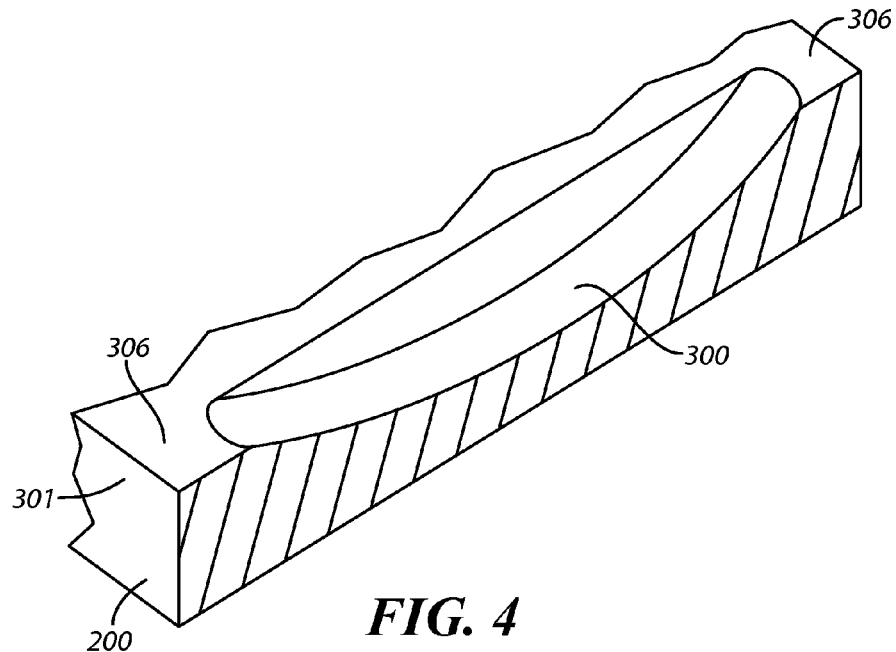
FIG. 4 comprises a perspective, cutaway, detail view as configured in accordance with various embodiments of the invention.

Using such a digital file permits optimizing the actual line gradation to accommodate (or leverage) the characteristics of specific materials. In essence this approach creates a Gaussian gradation having lower values at the two outer opposing extremes of the channel (i.e., the beginning and the ending of the channel) and a smooth natural progression to the highest value at the channel's center. FIGS. 3 and 4 provide illustrative examples in these regards.

In this example a given channel 300 comprises an area where substrate material has been removed (via, for example, the aforementioned ablation process). A first edge of the substrate 200 comprises a light-receiving input 301 to receive light rays 302. In this illustrative example, a second, opposing edge of the substrate also comprises a light-receiving input 303 to receive additional light rays 304. As shown, the bottom 305 of the channel 300 varies smoothly as a gradient and becomes gradually deeper towards the center of the channel 300. For many application settings the smoothness of this gradation can be important as inflections or other irregular surface perturbation in the bottom 305 will effectively change the path-reflected light characteristics and create a visual artifact that detracts from a substantially uniform light output.

By one approach such a channel 300 can begin and end at the very edges of the substrate 200. By another approach, and as illustrated, the light-receiving inputs for these light-receiving channels 200 are disposed inwardly of the substrate's edges (as represented by reference numeral 306). This can comprise, for example, using an offset of about 0.22 inches to separate the substrate's edge from the channel 300. Such an offset can serve to permit incoming light 302 and 304 to cone correctly before entering the light-receiving channel 300.

Figure 5:
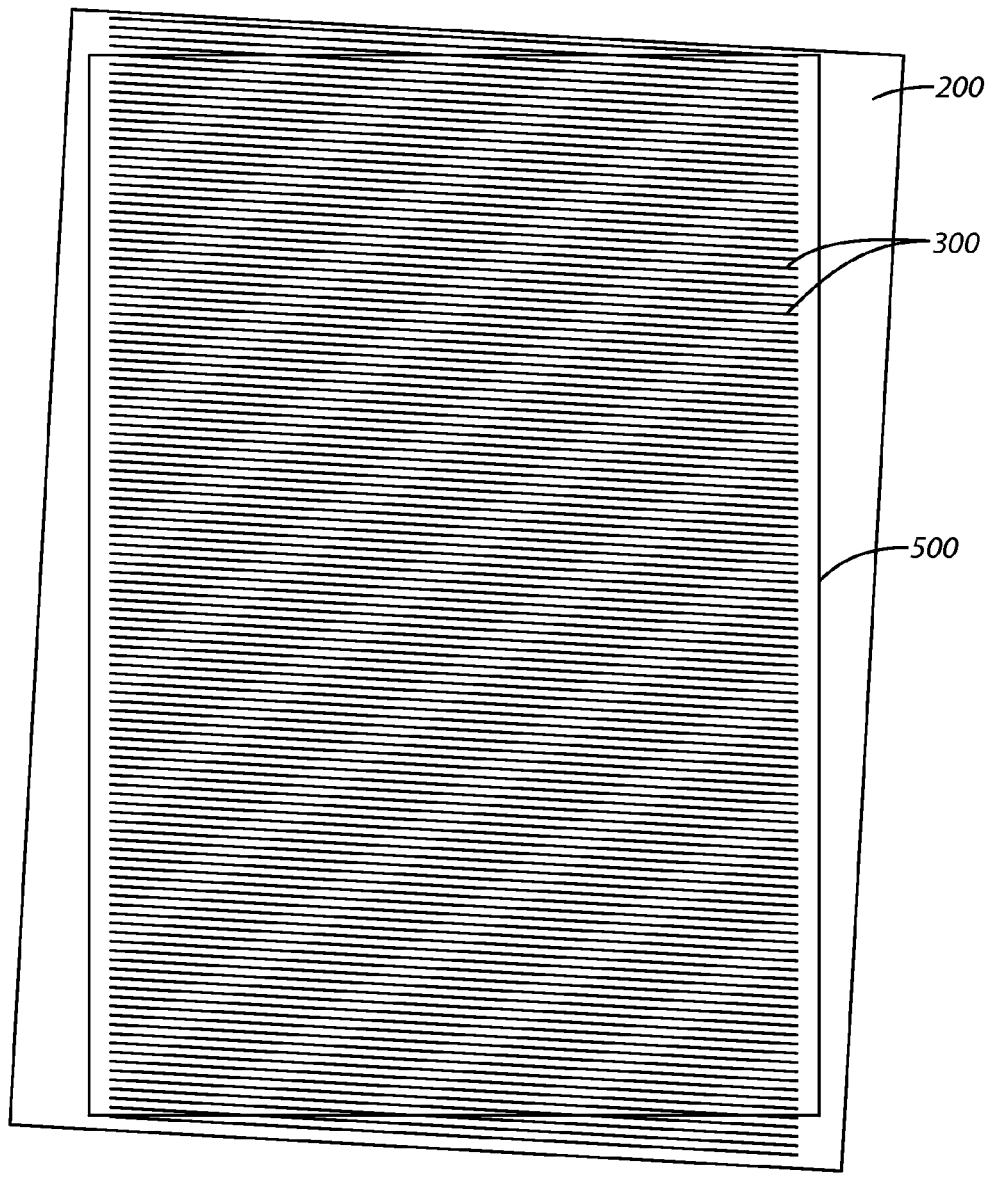
FIG. 5 comprises a top plan view as configured in accordance with various embodiments of the invention.

As noted above, this process 100 provides for providing a plurality of such light-receiving channels 300. By one approach, these light-receiving channels 300 are disposed substantially parallel to one another as depicted in FIG. 5. For many application settings it can be advantageous to substantially equally space these light-receiving channels 300 apart from one another. As one illustrative example in these regards, a spacing of about 0.112 inches can serve when the light-receiving channels 300 themselves have a width that is wide enough to support use with the employed light sources and the substrate thickness.

By one approach, if desired, these light-receiving channels 300 can be formed orthogonally to the light-receiving edges of the substrate 200. For many application settings, however, it can be advantageous to dispose at least some (and preferably all) of these light-receiving channels 300 at other than an orthogonal angle with respect to those substrate edges that are most proximal to the light-receiving inputs for the channels. Generally speaking, the angle can be such that the end of one channel substantially coincides with a same orthogonal line that matches the opposing end of a next adjacent channel. So configured, light entering the side edges of the substrate 200 at a perpendicular angle will be able to contact and reflect off of the walls of the channels and thereby aid in providing the desired backlighting result.

As illustrated in FIG. 5, one can achieve this result by skewing the substrate 200 to the desired offset angle while using the laser beam 201 to form the light-receiving channels 300. The desired display backlight 500 can then be cut from the substrate 200 to provide, for example, a rectangle having side edges that are evenly spaced from the end points of the channels 300 and where those channels 300 have the desired offset angle with respect to those side edges.

Figure 6:
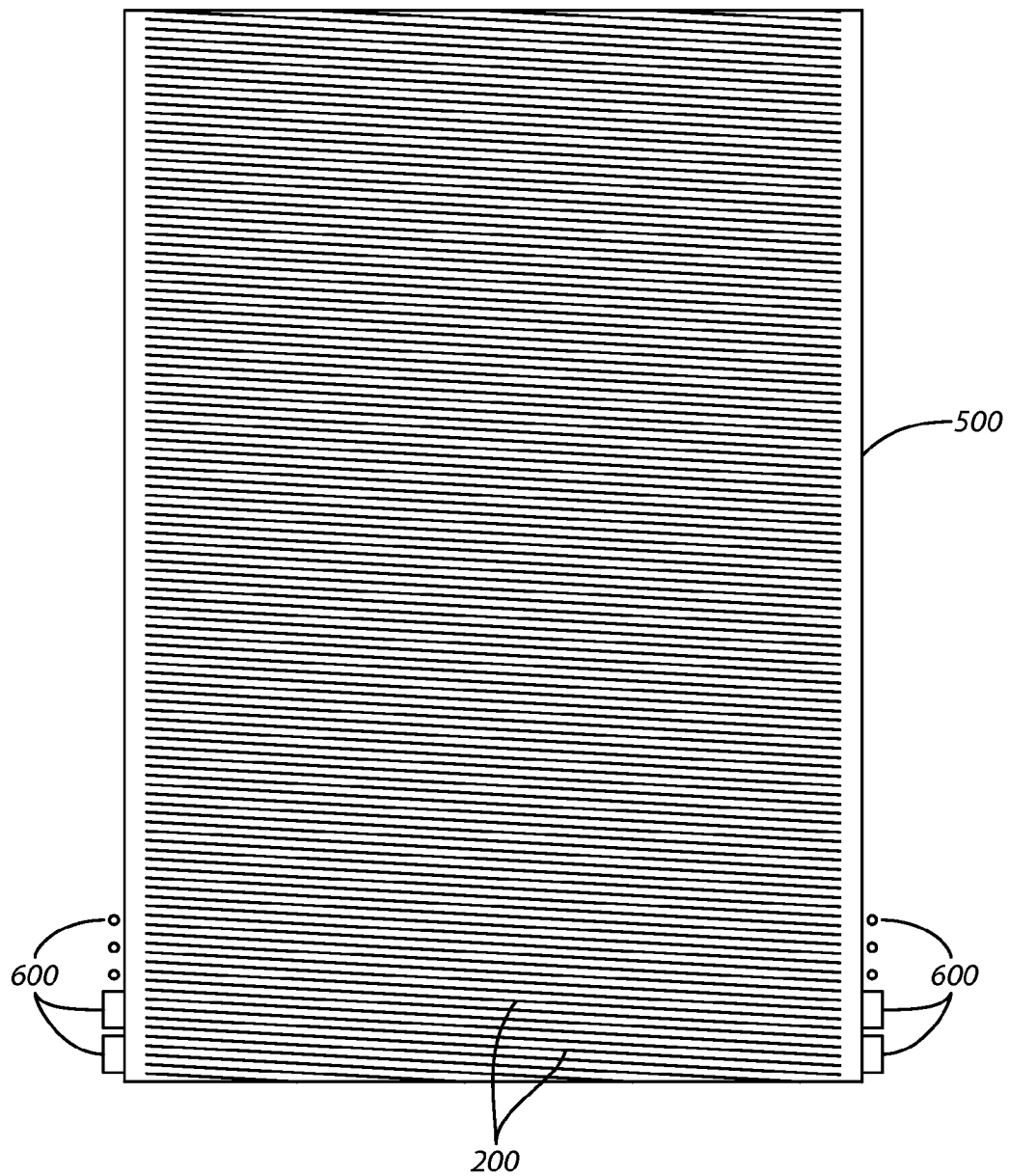
FIG. 6 comprises a top plan view as configured in accordance with various embodiments of the invention.

Referring now to FIGS. 1 and 6, at optional step 103 this process 100 can provide for also disposing a plurality of light sources 600 along at least one edge (and preferably along both opposing side edges) of the display backlight 500 in order to direct light into the light-receiving inputs of the aforementioned light-receiving channels 300. These light sources 600 can comprise, for example, light-emitting diodes. Light-emitting diodes are available in a variety of colors. For many application settings, white-light light-emitting diodes provide a useful backlight color and effect.

By one approach the foregoing might comprise providing a single light source 600 for a single corresponding light-receiving channel 300. By another approach, and as suggested by the illustration of FIG. 6, it can be useful to utilize a single light source 600 in conjunction with a plurality of successively-adjacent light-receiving channels 300.

Figure 7:
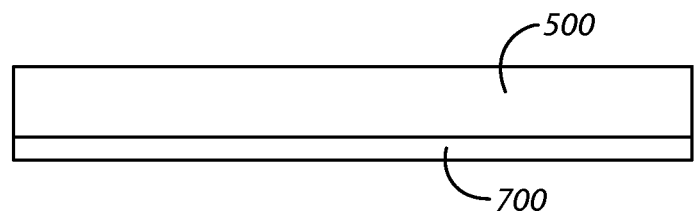
FIG. 7 comprises a side-elevational view as configured in accordance with various embodiments of the invention.

Referring now to FIGS. 1 and 7, at optional step 104 this process 100 will also provide for disposing a reflective-backing material 700 on a backside of the substrate/display backlight 200/500. This can comprise, for example, placing a highly-reflective white diffuser in contact with the backside of the display backlight 500 to facilitate second-order scattering effects by reflecting light back into and through the display backlight to further enhance the luminance factor as well as visual uniformity. Such a reflective-backing material 700 can be secured in any of a variety of ways. This can include the use of a variety of adhesives, tapes, and affixment members and mechanisms as desired.

Figure 8:
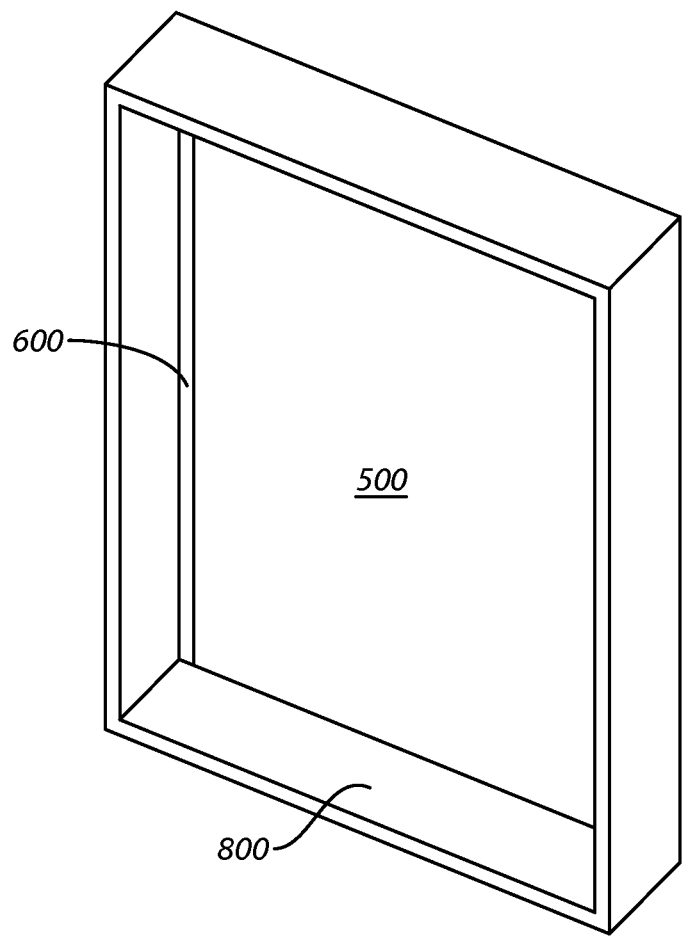
FIG. 8 comprises a perspective view as configured in accordance with various embodiments of the invention.

Referring now to FIG. 8, such a display backlight 500 can be placed inside a display box 800 such that the display backlight 500 will be located behind the desired signage (not shown). So disposed, light sourced by the aforementioned light sources 600 will enter the display backlight 500 and exit the outwardly-facing front of the display backlight 500 in a substantially bright and uniform manner. This, in turn, provides good backlighting for a variety of signage media including but not limited to paperstock-based signage, acrylic-substrate-based signage, and so forth.

Such a display backlight can be economically manufactured and operated. The space requirements for such a display backlight are considerably more modest than, for example, fluorescent-based display backlights and thereby permit greater flexibility with respect to the design and placement of the corresponding signage.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As one illustrative example in these regards, the aforementioned substrate 200 can be molded to include some or all of the aforementioned channels. As another illustrative example in these regards, the aforementioned algorithm can be normalized as desired over a given length or tonal range and can be customized for essentially any angle, frequency, or line spacing as may be desired.

We claim:

1. An apparatus comprising:
a display backlight having:
a substrate;
a plurality of light-receiving channels formed in the substrate, wherein at least some of the plurality of channels have a depth that varies as a gradient along a longitudinal axis of the channel that is substantially axially aligned with a light-receiving input for the channel, and wherein at least some of the plurality of light-receiving channels are disposed at other than an orthogonal angle with respect to an edge of the substrate that is most proximal to the light-receiving inputs for the channels.

2. The apparatus of claim 1 wherein the substrate comprises a substantially transparent acrylic material.

3. The apparatus of claim 1 wherein the plurality of light-receiving channels are disposed substantially parallel to one another.

4. The apparatus of claim 1 wherein the light-receiving inputs for the light-receiving channels are disposed inwardly of an edge of the substrate.

5. The apparatus of claim 1 wherein at least some of the plurality of light-receiving channels have a light-receiving input at either end thereof.

6. The apparatus of claim 1 wherein at least some of the plurality of light-receiving channels are disposed at an angle such that one end of a first channel at least substantially coincides with an opposing end of an adjacent channel along a line that is orthogonal to the edge of the substrate.

7. The apparatus of claim 1 wherein the plurality of light-receiving channels are substantially-equally spaced apart from one another.

8. The apparatus of claim 1 further comprising:
a plurality of light sources disposed along at least one edge of the substrate in order to direct light into the light-receiving inputs of the channels.

9. The apparatus of claim 8 wherein the light sources comprise light-emitting diodes.

10. The apparatus of claim 9 further comprising:
a reflective-backing material disposed on a backside of the substrate.

11. A method comprising:
providing a substrate;
forming a plurality of light-receiving channels in the substrate, wherein at least some of the plurality of channels have a depth that varies as a gradient along a longitudinal axis of the channel that is substantially axially aligned with a light-receiving input for the channel and wherein at least some of the plurality of light-receiving channels are disposed at other than an orthogonal angle with respect to an edge of the substrate that is most proximal to the light-receiving inputs for the channels.

12. The method of claim 11 wherein forming the plurality of light-receiving channels in the substrate comprises using a laser to form the plurality of light-receiving channels in the substrate.

13. The method of claim 12 wherein the substrate comprises a substantially transparent acrylic material.

14. The method of claim 12 wherein forming the plurality of light-receiving channels in the substrate comprises forming a plurality of substantially parallel light-receiving channels in the substrate.

15. The method of claim 12 wherein the substrate has edges and wherein forming the plurality of light-receiving channels in the substrate comprises forming the light-receiving channels inwardly of the edges of the substrate.

16. The method of claim 12 wherein the plurality of light-receiving channels are substantially-equally spaced apart from one another.

17. The method of claim 13 further comprising:
disposing a plurality of light sources along at least one edge of the substrate in order to direct light into the light-receiving inputs of the channels.

18. The method of claim 17 wherein the light sources comprise light-emitting diodes.

19. The method of claim 11 wherein forming a plurality of light-receiving channels in the substrate, wherein at least some of the plurality of channels have a depth that varies as a gradient comprises using the algorithm $$Y=337.47-12.212x+0.48670x^2-1.0124e-2x^3+9.7319e-5x^4-3.5898e-7x^5 R^2=1.000$$

where Y and X represent Y and X coordinates, e represents a natural logarithm base, and R2 represents a goodness of fit between points within the gradient.

* * * * *